(12) United States Patent
Cobb

(10) Patent No.: US 11,840,823 B2
(45) Date of Patent: Dec. 12, 2023

(54) BACKHOE CAMERA ASSEMBLY

(71) Applicant: Darrell Cobb, Charlestown, IN (US)

(72) Inventor: Darrell Cobb, Charlestown, IN (US)

( * ) Notice: Subject to any disclaimer, the term of this patent is extended or adjusted under 35 U.S.C. 154(b) by 139 days.

(21) Appl. No.: 17/217,763

(22) Filed: Mar. 30, 2021

(65) Prior Publication Data

US 2022/0316172 A1 Oct. 6, 2022

(51) Int. Cl.
*E02F 3/43* (2006.01)
*H04N 7/18* (2006.01)

(52) U.S. Cl.
CPC .............. *E02F 3/435* (2013.01); *H04N 7/181* (2013.01)

(58) Field of Classification Search
CPC ................................ E02F 3/435; H04N 7/181
See application file for complete search history.

(56) References Cited

U.S. PATENT DOCUMENTS

| 5,247,900 | A  | * | 9/1993  | Sobczak | G09F 17/00 |
|---|---|---|---|---|---|
|  |  |  |  |  | 116/211 |
| 5,848,485 | A  | * | 12/1998 | Anderson | E02F 3/435 |
|  |  |  |  |  | 701/50 |
| 6,085,452 | A  | * | 7/2000  | Davis | G09F 7/00 |
|  |  |  |  |  | 248/533 |
| 6,735,888 | B2 |   | 5/2004  | Green |  |
| 7,605,692 | B2 |   | 10/2009 | Yamada |  |
| 9,113,047 | B2 |   | 8/2015  | Onuma |  |
| 2014/0354813 | A1 |   | 12/2014 | Ishimoto |  |
| 2015/0108811 | A1 | * | 4/2015  | Muehlbauer | B60N 2/143 |
|  |  |  |  |  | 297/344.21 |
| 2017/0008430 | A1 | * | 1/2017  | Randleman | B60N 2/99 |
| 2019/0093317 | A1 |   | 3/2019  | Izumikawa |  |
| 2021/0140766 | A1 | * | 5/2021  | Bellmann | G06T 7/521 |
| 2021/0156119 | A1 | * | 5/2021  | Kovanen | G06V 20/52 |
| 2022/0178691 | A1 | * | 6/2022  | Prince | G01C 15/06 |
| 2022/0220708 | A1 | * | 7/2022  | Smits | B60R 16/033 |

FOREIGN PATENT DOCUMENTS

WO   WO2013099491        7/2013
WO   WO-2020229534 A1 * 11/2020 ............... B60R 1/23

* cited by examiner

*Primary Examiner* — Richard A Hansell, Jr.

(57) ABSTRACT

A backhoe camera assembly includes a camera unit that is pivotally attached to a bucket of a backhoe to capture imagery of a work area beneath the bucket. A display is coupled to the backhoe and the display is oriented to face a seat in the backhoe. The display is in communication with the camera unit thereby facilitating the display to display imagery captured by the camera unit to the operator. A lifting unit is integrated into the seat of the backhoe to adjust a height of the seat for enhancing the operator's ability to see the work area beneath the bucket of the backhoe. A plurality of reflectors is each positionable around the work area at strategic locations to facilitate the operator to view the work area on each of the reflectors.

4 Claims, 4 Drawing Sheets

BACKHOE CAMERA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to camera devices and more particularly pertains to a new camera device for enhancing visibility of a work area for an operator of a backhoe. The device includes a camera mounted to a bucket of the backhoe and a plurality of reflectors that can be positioned around the work area. The camera displays images of the work area and the reflectors facilitate the operator to view the work area from a variety of angles.

(2) Description of Related Art Including Information Disclosed Under 37 CFR 1.97 and 1.98

The prior art relates to camera devices including an imaging device that produces images of buried utility lines for a backhoe operator. The prior art also discloses a variety of camera imaging devices that are mounted to a backhoe for enhancing visibility of a work area for an operator. In no instance does the prior art disclose a camera mounted to a backhoe in combination with a plurality of mirrors that can be positioned around a work area for enhancing visibility of the work area for an operator.

BRIEF SUMMARY OF THE INVENTION

An embodiment of the disclosure meets the needs presented above by generally comprising a camera unit that is pivotally attached to a bucket of a backhoe to capture imagery of a work area beneath the bucket. A display is coupled to the backhoe and the display is oriented to face a seat in the backhoe. The display is in communication with the camera unit thereby facilitating the display to display imagery captured by the camera unit to the operator. A lifting unit is integrated into the seat of the backhoe to adjust a height of the seat for enhancing the operator's ability to see the work area beneath the bucket of the backhoe. A plurality of reflectors is each positionable around the work area at strategic locations to facilitate the operator to view the work area on each of the reflectors.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
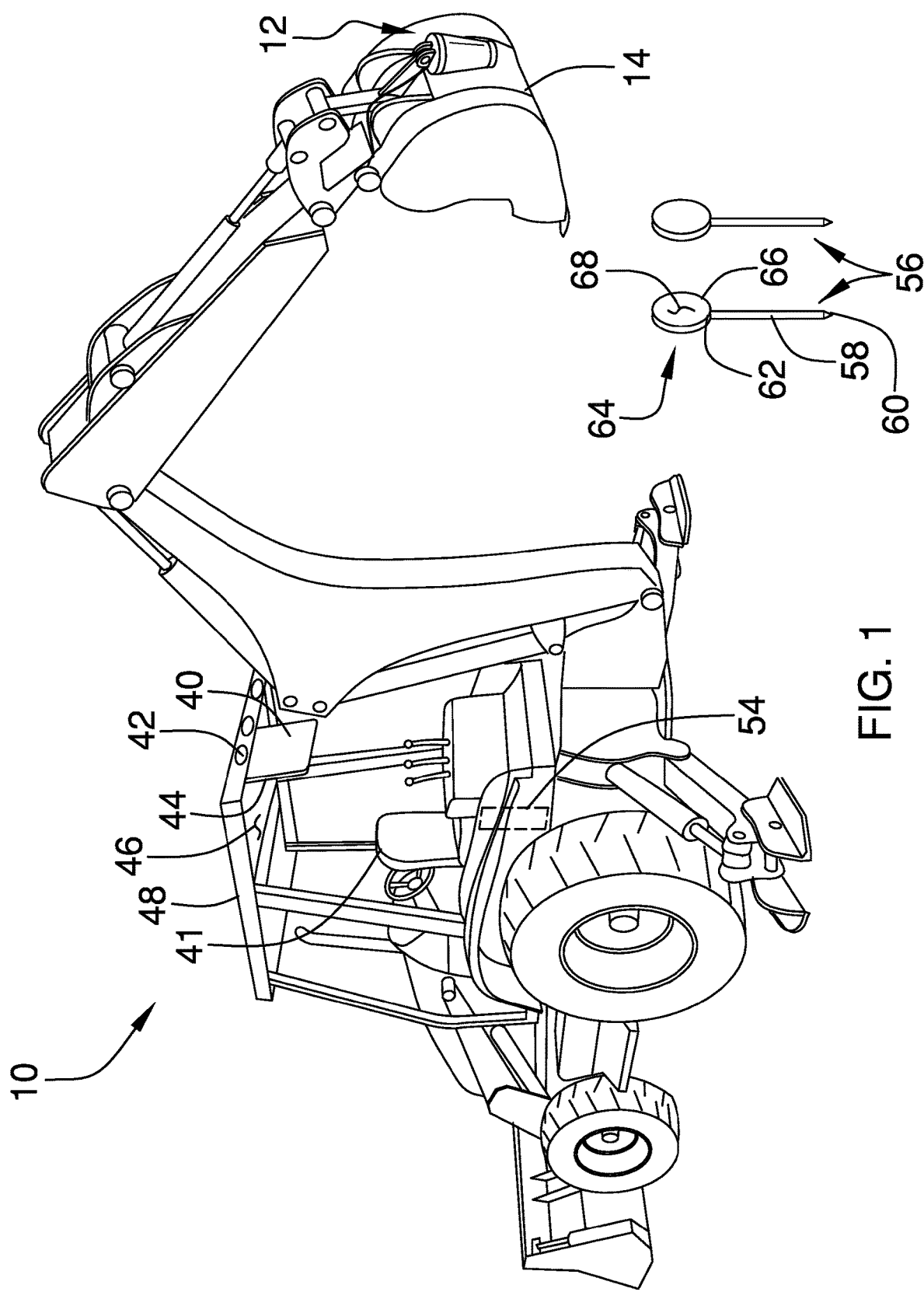
FIG. 1 is a perspective view of a backhoe camera assembly according to an embodiment of the disclosure.
Figure 2:
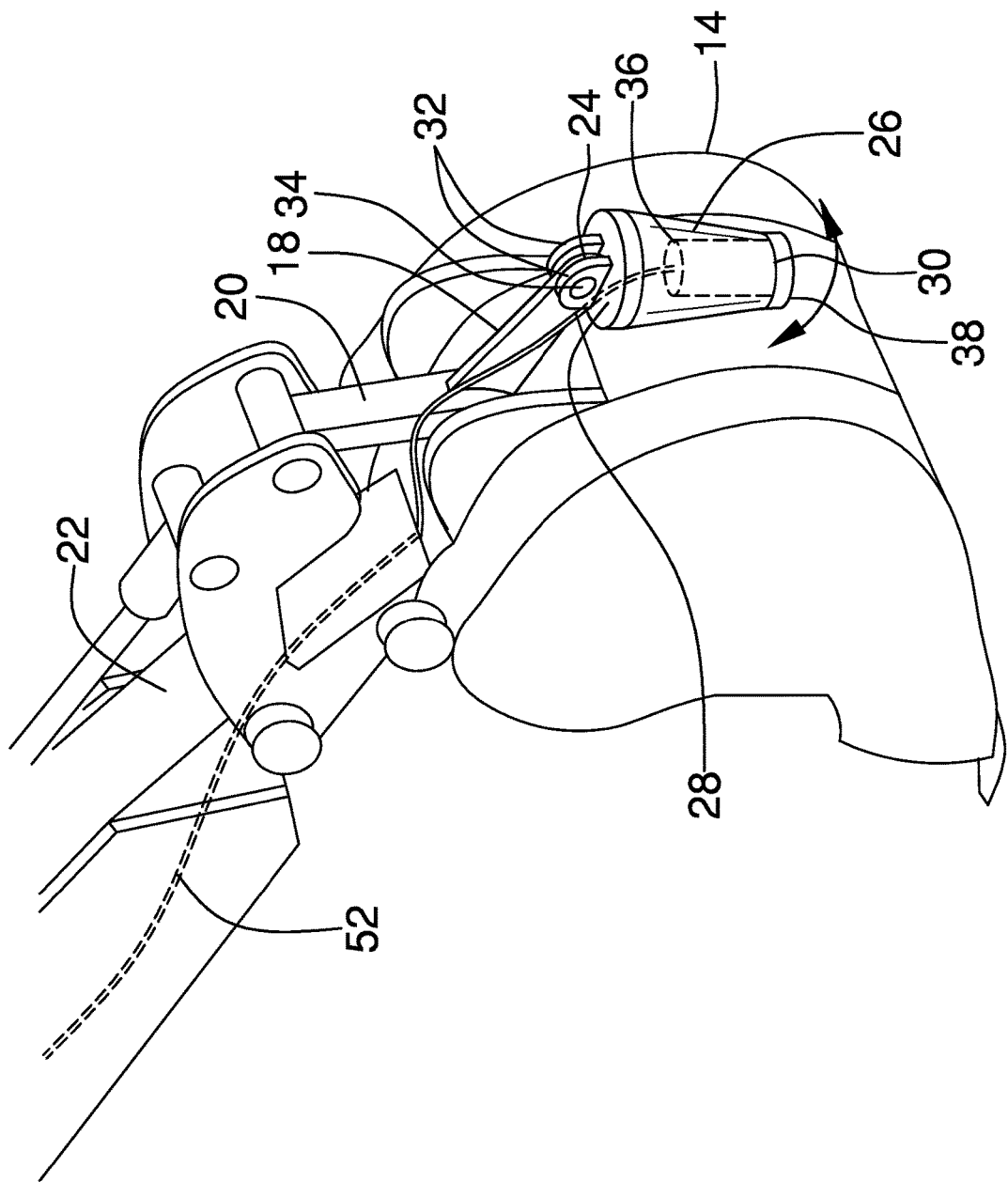
FIG. 2 is a perspective view of a bucket and a camera of an embodiment of the disclosure.
Figure 3:
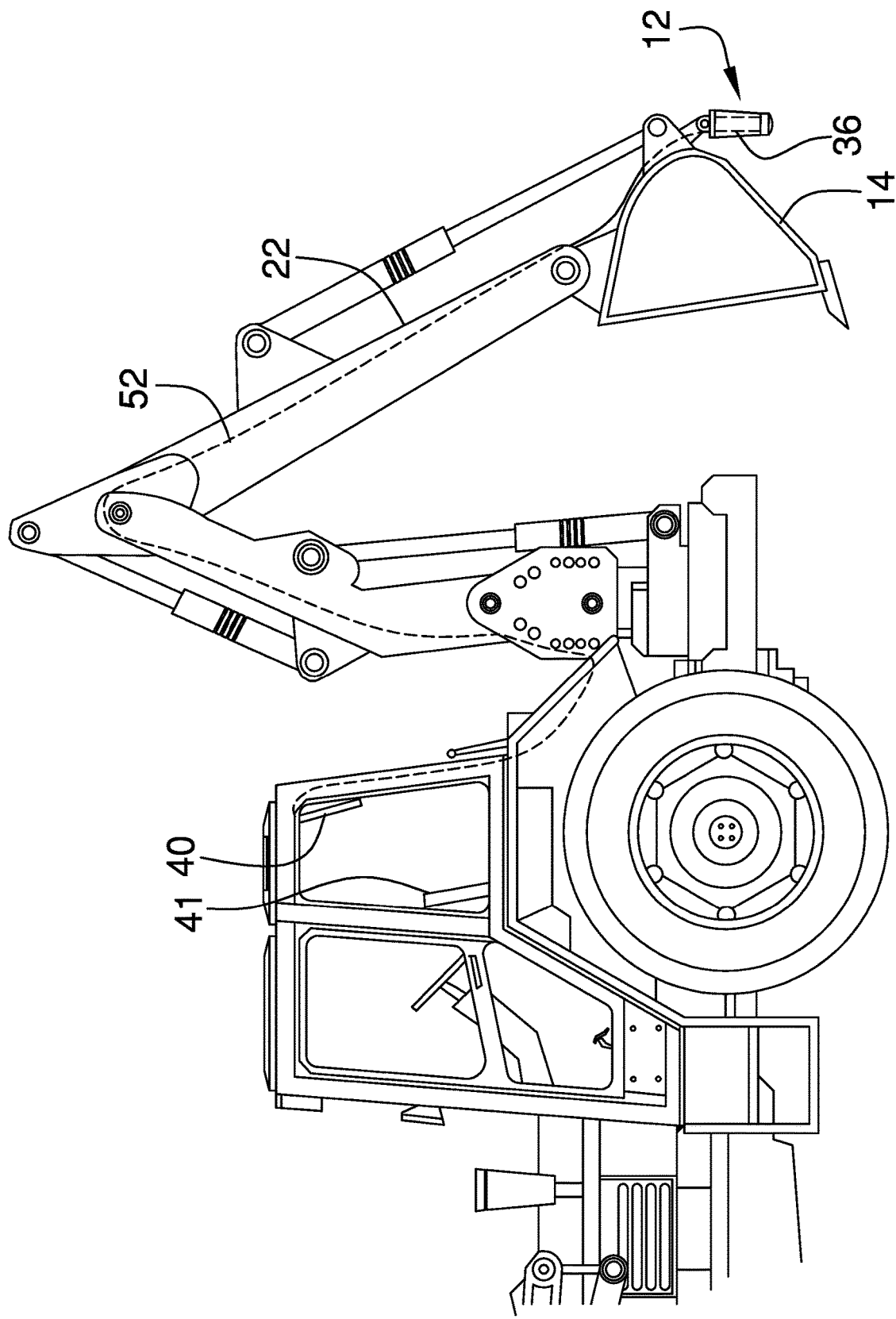
FIG. 3 is a right side phantom view of an embodiment of the disclosure.
Figure 4:
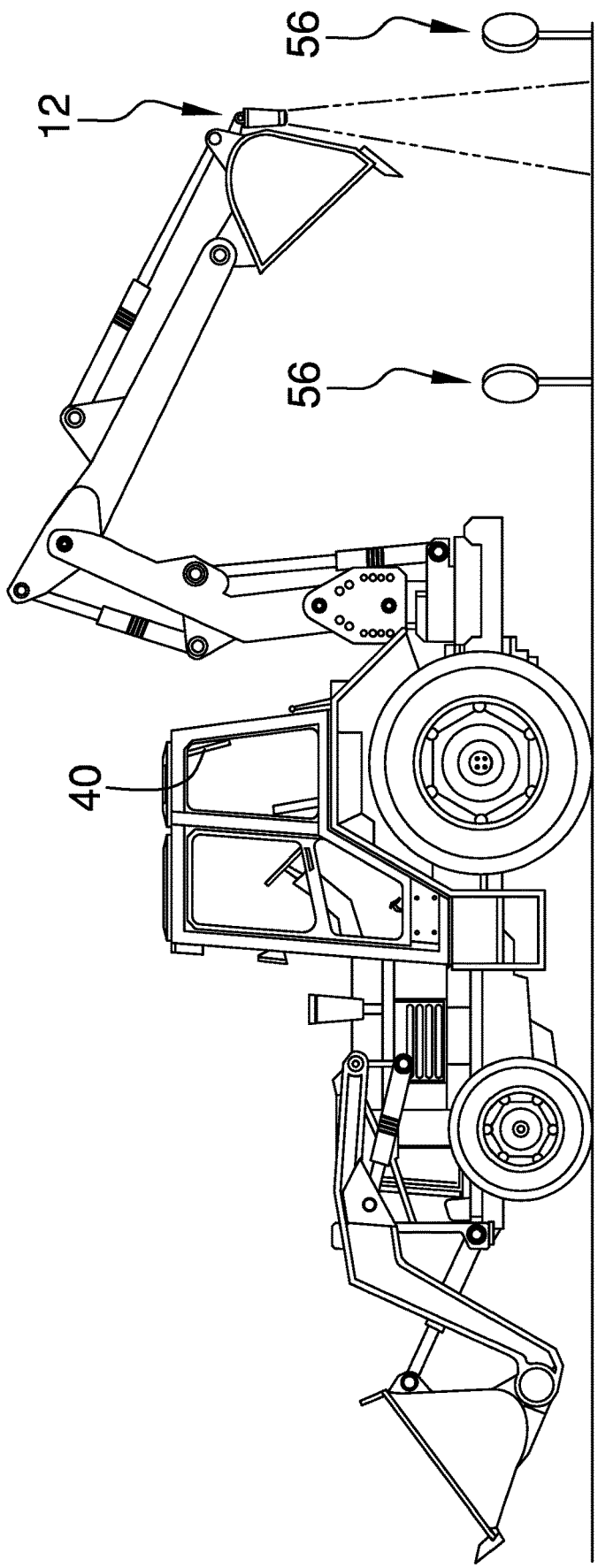
FIG. 4 is a perspective in-use view of an embodiment of the disclosure.

With reference now to the drawings, and in particular to FIGS. 1 through 4 thereof, a new camera device embodying the principles and concepts of an embodiment of the disclosure and generally designated by the reference numeral 10 will be described.

As best illustrated in FIGS. 1 through 4, the backhoe assembly 10 generally comprises a camera unit 12 is pivotally attached to a bucket 14 of a backhoe 16 to capture imagery of a work area beneath the bucket 14. The backhoe 16 may comprise a tractor mounted backhoe that would typically be employed for excavation work and construction work. The camera unit 12 comprises a mount 18 that is coupled to and extends away from a pivot point 20 of the bucket 14. Moreover, the mount 18 extends along a line that is oriented parallel to a longitudinal axis of an arm 22 of the backhoe 16 to which the bucket 14 is attached, and the mount 18 has a distal end 24 with respect to the pivot point 20.

The camera unit 12 includes a cylinder 26 that has a top end 28 and a bottom end 30. The camera unit 12 includes a pair of pivots 32 and each of the pivots 32 is coupled to and extends upwardly from the top end 28. The pivots 32 are spaced apart from each other and the distal end 24 of the mount 18 is positioned between the pivots 32. The camera unit 12 includes a pin 34 extending through each of the pivots 32 and engaging the distal end 24 of the mount 18 such that the cylinder 26 is pivotally retained on the mount 18. Moreover, the cylinder 26 pivots on the mount 18 when the backhoe 16 is operated such that an axis extending through the top end 28 and the bottom end 30 of the cylinder 26 is continually aligned with a vertical axis. In this way the bottom end 30 of the cylinder 26 is continually directed toward the ground.

The camera unit 12 includes a camera 36 that is integrated into the cylinder 26. The camera 36 includes a lens 38 that is positioned on the bottom end 30 of the cylinder 26. In this way the camera 36 can continually capture imagery of the ground thereby facilitating an operator of the backhoe 16 to have a clear view of the ground beneath the bucket 14. The camera 36 may comprise a digital video camera or other type of electronic camera 36.

A display 40 is provided and the display 40 is coupled to the backhoe 16. The display 40 is oriented to face a seat 41 in the backhoe 16 such that the display 40 is visible to the operator. The display 40 is in communication with the camera unit 12 thereby facilitating the display 40 to display imagery captured by the camera unit 12. In this way the display 40 facilitates the operator to view the imagery. The display 40 has a top edge 42 and a front face 44, and the top edge 42 is coupled to a lower surface 46 of a roof 48 of the backhoe 16 having the front face 44 being directed toward the seat 41 of the backhoe 16. The display 40 may comprise a liquid crystal display or other type of electronic display. A conductor 52 is electrically coupled between the camera 36 and the display 40, and the conductor 52 is positioned within the backhoe 16 thereby inhibiting the conductor 52 from being damaged.

A lifting unit 54 is provided and the lifting unit 54 is integrated into the seat 41 of the backhoe 16. In this way the lifting unit 54 can adjust a height of the seat 41 to enhance the operator's ability to see the work area beneath the bucket 14 of the backhoe 16. The lifting unit 54 may comprise a pneumatic piston, a hydraulic piston or other type of adjustable biasing member that not only has an adjustable height, but is also compressible to enhance comfort for the operator.

A plurality of reflectors 56 is provided and each of the reflectors 56 is positionable around the work area at strategic locations. Each of the reflectors 56 is comprised of a light reflecting material to facilitate the operator to view the work area on each of the reflectors 56. Each of the reflectors 56 comprises a stake 58 that has a lower end 60 and an upper end 62, and the lower end 60 tapers to a point to pierce the ground. Each of the reflectors 56 includes a mirror 64 that has a perimeter edge 66 and a reflective surface 68. The reflective surface 68 is comprised of a light reflecting material that is common to mirrors, and the perimeter edge 66 is coupled to the upper end 62 of the stake 58. The stake 58 is positionable at a preferred angle of rotation such that the reflective surface 68 of the mirror 64 is directed toward the seat 41 of the backhoe 16. In this way the reflective surface 68 is visible to the operator.

In use, the reflectors 56 are positioned at strategic locations around the work area such that the mirror 64 associated with each of the reflectors 56 is directed toward the operator of the backhoe 16. In this way the operator is empowered to view the work area from multiple angles. Additionally, the display 40 displays the imagery that is captured by the camera 36 while the operator is operating the backhoe 16 for excavation work. In this way the operator has enhanced visibility of the work area while the operator is employing the backhoe 16 to excavate in the work area.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A backhoe camera assembly for enhancing visibility of a work area for a backhoe operator, said assembly comprising:
a camera unit being pivotally attached to a bucket of a backhoe wherein said camera unit is configured to capture imagery of a work area beneath the bucket;
a display being coupled to the backhoe, said display being oriented to face a seat in the backhoe wherein said display is configured to be visible to the operator, said display being in communication with said camera unit thereby facilitating said display to display imagery captured by said camera unit wherein said display is configured to facilitate the operator to view the imagery;
a lifting unit being integrated into the seat of the backhoe such that said lifting unit adjusts a height of the seat wherein said lifting unit is configured to enhance the operator's ability to see the work area beneath the bucket of the backhoe;
a plurality of reflectors, each of said reflectors being positionable around the work area at strategic locations, each of said reflectors being comprised of a light reflecting material wherein each of said reflectors is configured to facilitate the operator to view the work area on each of said reflectors; and
wherein each of said reflectors comprises:
a stake having a lower end and an upper end, said lower end tapering to a point wherein said lower end is configured to pierce the ground; and
a mirror having a perimeter edge and a reflective surface, said reflective surface being comprised of a light reflecting material, said perimeter edge being coupled to said upper end of said stake, said stake being positionable at a preferred angle of rotation such that said reflective surface of said mirror is directed toward the seat of the backhoe wherein said reflective surface is configured to be visible to the operator;
said camera unit comprising:
a mount being coupled to and extending away from a pivot point of the bucket such that said mount extends along a line being oriented parallel to a longitudinal axis of an arm of the backhoe to which the bucket is attached, said mount having a distal end with respect to the pivot point;
a cylinder having a top end and a bottom end;
a pair of pivots, each of said pivots being coupled to and extending upwardly from said top end, said pivots being spaced apart from each other, said distal end of said mount being positioned between said pivots;

a pin extending through each of said pivots and engaging said distal end of said mount such that said cylinder is pivotally retained on said mount, said cylinder pivoting on said mount when the backhoe is operated such that an axis extending through said top end and said bottom end of said cylinder is continually aligned with a vertical axis wherein said bottom end of said cylinder is configured to be continually directed toward the ground; and a camera being integrated into said cylinder, said camera including a lens being positioned on said bottom end of said cylinder wherein said camera is configured to continually capture imagery of the ground thereby facilitating an operator of the backhoe to have a clear view of the ground beneath the bucket;

said display having a top edge and a front face, said top edge being coupled to a lower surface of a roof of the backhoe having said front face being directed toward the seat;

a conductor being electrically coupled between said camera and said display, said conductor being positioned within the backhoe thereby inhibiting said conductor from being damaged.

2. A backhoe camera assembly for enhancing visibility of a work area for a backhoe operator, said assembly comprising:

a camera unit being pivotally attached to a bucket of a backhoe wherein said camera unit is configured to capture imagery of a work area beneath the bucket;

a display being coupled to the backhoe, said display being oriented to face a seat in the backhoe wherein said display is configured to be visible to the operator, said display being in communication with said camera unit thereby facilitating said display to display imagery captured by said camera unit wherein said display is configured to facilitate the operator to view the imagery;

a lifting unit being integrated into the seat of the backhoe such that said lifting unit adjusts a height of the seat wherein said lifting unit is configured to enhance the operator's ability to see the work area beneath the bucket of the backhoe; and a plurality of reflectors, each of said reflectors being positionable around the work area at strategic locations, each of said reflectors being comprised of a light reflecting material wherein each of said reflectors is configured to facilitate the operator to view the work area on each of said reflectors;

wherein said camera unit comprises a mount being coupled to and extending away from a pivot point of the bucket such that said mount extends along a line being oriented parallel to a longitudinal axis of an arm of the backhoe to which the bucket is attached, said mount having a distal end with respect to the pivot point; and wherein said camera unit includes:

a cylinder having a top end and a bottom end;

a pair of pivots, each of said pivots being coupled to and extending upwardly from said top end, said pivots being spaced apart from each other, said distal end of said mount being positioned between said pivots; and a pin extending through each of said pivots and engaging said distal end of said mount such that said cylinder is pivotally retained on said mount, said cylinder pivoting on said mount when the backhoe is operated such that an axis extending through said top end and said bottom end of said cylinder is continually aligned with a vertical axis wherein said bottom end of said cylinder is configured to be continually directed toward the ground.

3. The assembly according to claim 2, wherein said camera unit includes a camera being integrated into said cylinder, said camera including a lens being positioned on said bottom end of said cylinder wherein said camera is configured to continually capture imagery of the ground thereby facilitating an operator of the backhoe to have a clear view of the ground beneath the bucket.

4. A backhoe camera system for enhancing visibility of a work area for a backhoe operator, said system comprising:

a backhoe having an arm, a bucket being pivotally coupled to said arm and a seat wherein said seat is configured to facilitate an operator to sit on said seat;

a camera unit being pivotally attached to said bucket wherein said camera unit is configured to capture imagery of a work area beneath said bucket, said camera unit comprising:

a mount being coupled to and extending away from a pivot point of said bucket such that said mount extends along a line being oriented parallel to a longitudinal axis of said arm of said backhoe to which said bucket is attached, said mount having a distal end with respect to said pivot point;

a cylinder having a top end and a bottom end;

a pair of pivots, each of said pivots being coupled to and extending upwardly from said top end, said pivots being spaced apart from each other, said distal end of said mount being positioned between said pivots;

a pin extending through each of said pivots and engaging said distal end of said mount such that said cylinder is pivotally retained on said mount, said cylinder pivoting on said mount when said backhoe is operated such that an axis extending through said top end and said bottom end of said cylinder is continually aligned with a vertical axis wherein said bottom end of said cylinder is configured to be continually directed toward the ground; and a camera being integrated into said cylinder, said camera including a lens being positioned on said bottom end of said cylinder wherein said camera is configured to continually capture imagery of the ground thereby facilitating an operator of said backhoe to have a clear view of the ground beneath said bucket;

a display being coupled to the backhoe, said display being oriented to face said seat in said backhoe wherein said display is configured to be visible to the operator, said display being in communication with said camera unit thereby facilitating said display to display imagery captured by said camera unit wherein said display is configured to facilitate the operator to view the imagery, said display having a top edge and a front face, said top edge being coupled to a lower surface of a roof of the backhoe having said front face being directed toward the seat;

a conductor being electrically coupled between said camera and said display, said conductor being positioned within said backhoe thereby inhibiting said conductor from being damaged;

a lifting unit being integrated into said seat of said backhoe such that said lifting unit adjusts a height of said seat wherein said lifting unit is configured to enhance the operator's ability to see the work area beneath said bucket of said backhoe; and a plurality of reflectors, each of said reflectors being positionable around the work area at strategic locations, each of said reflectors being comprised of a light reflecting material wherein each of said reflectors is configured to facilitate the operator to view the work area on each of said reflectors, each of said reflectors comprising:

a stake having a lower end and an upper end, said lower end tapering to a point wherein said lower end is configured to pierce the ground; and a mirror having a perimeter edge and a reflective surface, said reflective surface being comprised of a light reflecting material, said perimeter edge being coupled to said upper end of said stake, said stake being positionable at a preferred angle of rotation such that said reflective surface of said mirror is directed toward the seat of the backhoe wherein said reflective surface is configured to be visible to the operator.

* * * * *